United States Patent [19]
Gilliland

[11] 3,768,845
[45] Oct. 30, 1973

[54] DRAWER PULL ANCHORING DEVICE
[75] Inventor: James Harold Gilliland, Memphis, Tenn.
[73] Assignee: Memphis Furniture Manufacturing Co., Memphis, Tenn.
[22] Filed: May 4, 1972
[21] Appl. No.: 250,315

[52] U.S. Cl. ............................... 287/53 H, 16/121
[51] Int. Cl. ............................................. F16d 1/06
[58] Field of Search ................... 287/53 H, 20.92 B; 16/121, 38; 292/353; 74/553; 85/85, 88

[56] References Cited
UNITED STATES PATENTS
| | | | |
|---|---|---|---|
| 2,938,405 | 5/1960 | West | 287/53 H |
| 2,528,675 | 11/1950 | Tinnerman | 287/53 H |
| 2,293,491 | 8/1942 | Cox | 85/85 |

FOREIGN PATENTS OR APPLICATIONS
| | | | |
|---|---|---|---|
| 841,949 | 6/1952 | Germany | 16/121 |
| 240,639 | 10/1925 | Great Britain | 287/20.92 B |
| 396,815 | 8/1933 | Great Britain | 287/20.92 B |

*Primary Examiner*—Andrew V. Kundrat
*Attorney*—Thomas B. Van Poole et al.

[57] ABSTRACT

An anchoring device formed from a single piece of sheet metal for securing a cylindrical stud portion of a drawer pull or the like in a socket in a drawer front. The anchoring device is in the form of a split collet having a cylindrical sleeve portion terminating in outwardly projecting flange segments at one end and inwardly flaring tapered conical segments at the other end providing tooth formations to hold the stud in the sleeve portion following insertion. The sleeve portion includes a pair of inwardly bowing convex anchoring prongs to be driven outwardly into the drawer front material to anchor the sleeve portion in the socket.

6 Claims, 6 Drawing Figures

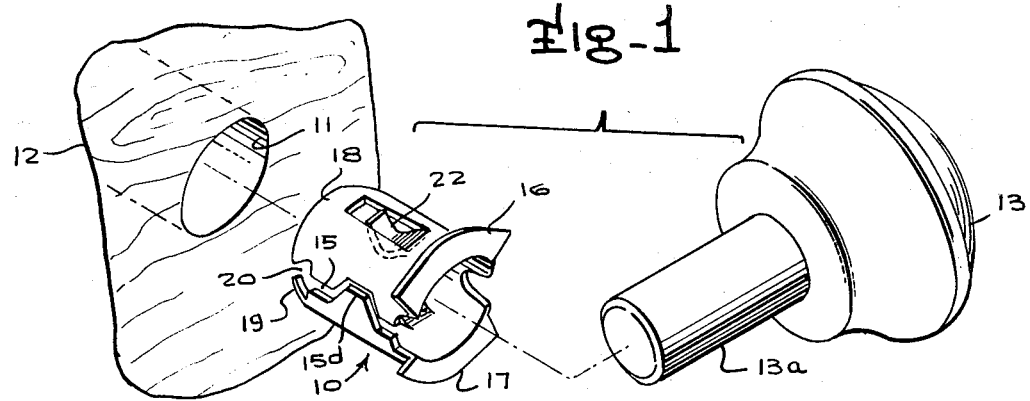
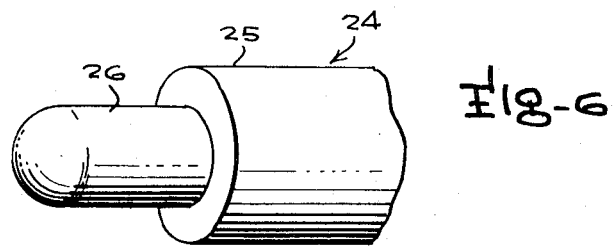
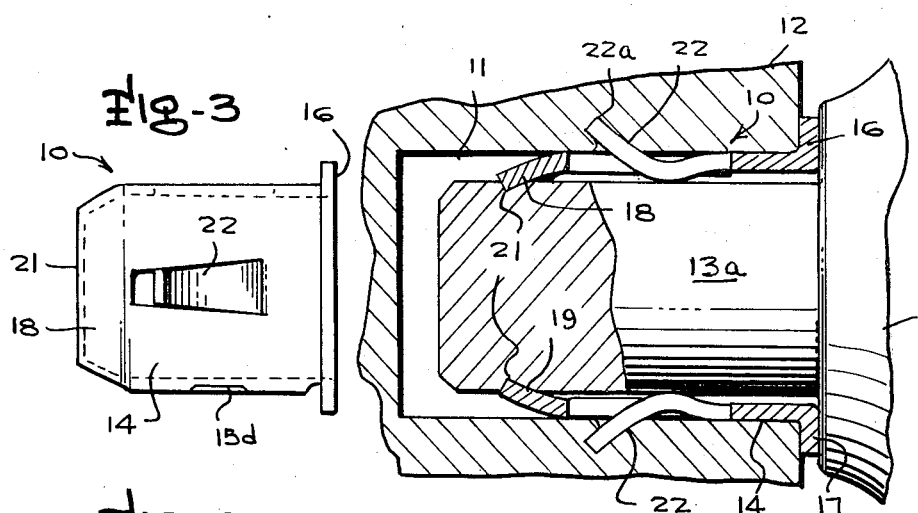
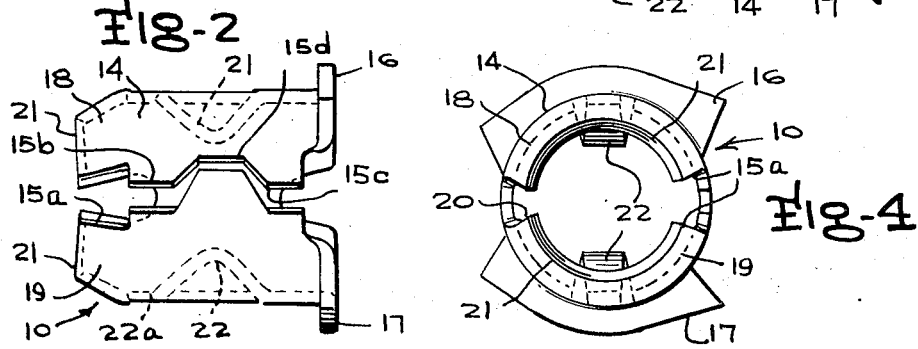

DRAWER PULL ANCHORING DEVICE

BACKGROUND AND OBJECTS OF THE INVENTION

The present invention relates in general to a drawer pull fastener or anchoring device, and more particularly to a drawer pull fastener formed from a single stamped sheet metal member which may be readily anchored within a drilled socket or cylindrical opening in a drawer front or similar wall member and which contains anchoring teeth which bite into and hold the stud portion of a drawer pull when the latter is inserted in the drilled socket or opening.

Heretofore, the customary means for fastening a knob or drawer pull to a drawer front has been to screw a threaded screw or stud portion of the knob or drawer pulll into the drawer front, or to extend a machine screw or the like through an opening from the rear of the drawer front and into a rearwardly opening threaded socket in the knob or drawer pull. It has been recognized that it would be desirable to avoid the use of such threaded elements to achieve fastening of the drawer pull or knob onto the wall of a piece of furniture, as the threads on the screw portion of the usual fastening device frequently lose their hold on the wood with age or with extended use, and the depth of the threads is frequently not sufficient to obtain a purchase on the wood which will withstand the strains imposed and maintain a secure fastening of the desired longevity and ease of assembly.

An object of the present invention, therefore, is the provision of a novel drawer pull anchoring device and anchored drawer pull assembly wherein the anchoring device is readily insertable in a drilled socket or hole in a drawer front or similar furniture wall, the device is anchored in the drilled socket or hole by use of a tool head of generally cylindrical configuration, and wherein teeth on the device will bite into the cylindrical stud projecting from a drawer pull or knob when the latter is inserted in the device to hold the latter against withdrawal.

Another object of the present invention is the provision of a novel anchoring device or fastener for securing a drawer pull or knob in a drilled socket, wherein the anchoring device is formed from a single piece of spring steel in the form of a split collet or ferrule of generally cylindrical configuration which is insertable into a cylindrical socket or hole and has a first pair of bent anchoring prongs or tabs to be forced outwardly by a cylindrical tool head into the surrounding drawer front material and having second holding teeth in a deformed portion of the device to bite into and hold the cylindrical stud portion of the drawer front when inserted into the device.

Other objects, advantages and capabilities of the present invention will become apparent from the following detailed description, taken in conjunction with the accompanying drawings illustrating a preferred embodiment of the invention.

BRIEF DESCRIPTION OF THE FIGURES

FIG. 1 is an exploded perspective view of the drawer pull anchoring device of the present invention shown with a fragmentary portion of a drawer front and with a typical drawer pull;

FIG. 2 is a side elevation view of the drawer pull anchoring device;

FIG. 3 is a top plan view thereof;

FIG. 4 is an end view of the anchoring device viewed from the inner end thereof;

FIG. 5 is a vertical section view illustrating the anchoring device in assembled relation in a drawer front with a drawer pull assembled therein; and FIG. 6 is a fragmentary perspective view of the head portion of an assembly tool which may be used to secure the anchoring device in the socket provided in the drawer front.

DETAILED DESCRIPTION OF A PREFERRED EMBODIMENT

Referring to the drawings, wherein like reference characters designate corresponding parts throughout the several figures, there is illustrated a drawer fastening device generally indicated by the reference character 10 designed to be readily insertable into and fastened in a socket or opening, such as the drilled cylindrical socket 11 in a drawer front 12 or similar wall of a piece of furniture, and into which the stud portion 13a of a drawer pull, knob or similar device 13 may then be inserted and which is securely fastened in place by two formations on the drawer pull anchoring device 10. The anchoring device 10 is preferably formed from a single piece of sheet stock such as high carbon spring steel having a thickness of about 0.20 inches, and which is stamped and shaped to form a fastener body which is basically in the form of a split collet or collar having an axially elongated, substantially cylindrical sleeve or body portion 14 which is interrupted along one circumferential zone thereof by a split 15 extending the axial length of the sleeve portion 14 along a zig-zag path or a path having portions which are circumferentially offset from other portions thereof. One axially end of the sleeve portion 14 terminates in a pair of diametrically opposite, radially outwardly projecting flange segments 16, 17 forming limit stops to butt against the front surface of the drawer front 12 and limit the extent of insertion of the anchoring device 10. The device axial end or inner end of the sleeve portion 14 is formed into two diametrically opposed, inwardly flaring conical segments or tapering segments 18, 19 defined by an enlarged portion 15a of the split 15 and by a diametrically opposed relieved portion or inset 20. The inwardly tapering conical segments 18 and 19 have sharpened edges 21 forming substantially semi-circular concave teeth to bite into opposite portions of the stud portion 13 a of the drawer pull or knob 13 when the stud portion 13a is projected fully into the anchoring device 10 and hold it against withdrawal. It will be observed from FIG. 2 that the split 15 in the cylindrical sleeve or body portion 14 of the split collet includes first portions 15b and 15c respectively adjacent the enlarged split portion 15a and the outer end of the sleeve portion which are in alignment with each other in the same radial plane of the sleeve portion, and that the split includes a center portion 15d extending in a truncated V-shaped path.

At the top and bottom of the anchoring device 10 as viewed in FIG. 4, are a pair of diametrically opposite anchoring prongs or fingers 22 cut from the sleeve portion 14 by forming relatively thin, truncated triangular cuts of the configuration shown best in FIG. 3, and bending the prongs or fingers 22 to an inwardly convex configuration toward the axis of the sleeve portion 14 so that the free ends or tips 22a of the prongs 22 are flush with the cylindrical outer surface of the sleeve portion 14.

In one practical embodiment of the anchoring device 10, the sleeve portion 14 may have an axial length of about 0.360 to 0.390 inch from the inner ends thereof at the sharpened edges 21 to the rear surface of the flange segments 16, 17 which abut the drawer front, and the cylindrical region of the sleeve portion 14 may have a normal inner diameter of about 0.255 to 0.275 inch. In this embodiment, the tapering segments 18, 19 may converge to a diameter of about 0.200 to about 0.210 inch, the anchoring prongs 22 may have a width of about 0.070 to 0.090 at their wider or base portions, and they may curve inwardly toward the axis of the sleeve portion 14 a distance of about 0.050 to 0.070 inch from the cylindrical region of the sleeve portion 14.

The drawer pull anchoring device 10 is designed to be inserted in a cylindrical socket, such as the socket 11, in a drawer front 12 or similar wall of a piece of furniture. Assuming the drawer pull anchoring device 10 is of the dimensions given above, the socket 11 would typically have a diameter of about 0.297 to 0.307 inch and, assuming a drawer pull with a stud having an axial length of about 0.50 inch, the depth of the socket 11 should be about 0.53 inch minimum. To fasten the anchoring device 10 in the socket 11, a suitable tool such as that illustrated in FIG. 6 may be used, having a cylindrical shank portion 25 which may be about 4 inches long and have a diameter of about 0.56 inch, for use with an anchoring device and socket of the dimensions indicated above, from which a tool head 26 projects having a diameter of about 0.240 to 0.250 inch, an axial length of about 3.1 inch, and having a spherically shaped end. To fasten the drawer pull anchoring device 10 in the socket 11, the anchoring device in the condition illustrated in FIGS. 2, 3 and 4 is manually inserted in the socket 11 until the flange segments 16 and 17 butt against the front wall of the drawer front of similar furniture wall. Then the tool head 26 of the assembly tool 24 is inserted in the sleeve portion 14 of the anchoring device 10 to a position engaging the spherical leading end portion thereof with the inwardly curving convex midportions of the anchoring prongs 22 and driving them outwardly to force the sharpened edges or teeth 22a thereof into the wood of the drawer front surrounding the socket 11. Upon full insertion of the tool head 26 into the sleeve portion 14, the anchoring prongs 22 will be deformed outwardly to remain in the position illustrated in FIG. 5, thus securely anchoring the anchoring device 10 in the socket. The stud portion 13a of the drawer pull 13 is then merely forced into the sleeve portion 14 of the anchoring device, whereupon the leading end portion or rear end of the stud 13a engages and forces radially outwardly the conically tapering segments 18, 19 of the sleeve portion 14 until the enlarged portion of the drawer pull 13 abuts the front or outer surfaces of the flange segments 16, 17. The teeth 21 at the free edges of the tapering segments 18, 19 are resiliently urged toward and bite slightly into the surface of the drawer pull stud 13a and any attempt to move the drawer pull outwardly from the socket and the anchoring device causes the teeth 21 of the tapering segments 18, 19 to bite more deeply into the stud 13a and securely hold it fully seated in the socket 11.

What is claimed is:

1. An anchoring device in the form of a split collet constructed of a single sheet of spring-like material for securing a drawer pull having a cylindrical stud portion in a cylindrical opening of a drawer front or the like, the anchoring device comprising an axially elongated substantially cylindrical sleeve portion to fit within said opening and to receive said stud portion therein, said sleeve portion defining an annular wall having inner and outer ends and a center axis and having a slit extending along the axial length thereof, means defining an integral stop shoulder surface projecting outwardly from the outer end of said sleeve portion to abut the front surface of the drawer front and limit insertion of the sleeve portion into the opening, the sleeve portion including bendable anchoring members having abutment portions extending toward said center axis from said wall to be engaged by an axially inserted tool and driven outwardly to extend the anchoring members outwardly from said wall and embed them in the surrounding material of said drawer front, and said sleeve portion having stud gripping formations in the insertion path of the stud portion to be stressed thereby and restrain the stud portion against withdrawal, said slit extending along a zig-zag path having two end portions at said inner and outer ends alined along a radial plane of said center axis and having an intermediate portion circumferentially offset from said end portions.

2. An anchoring device as defined in claim 1, wherein said anchoring members comprise elongated bendable prongs integral with said wall having a first end bendably joined to the wall near said outer end and a second end forming a narrow free end spaced toward said inner end from said first end, said prongs normally extending along an inwardly convex path from the first and second ends thereof to the longitudinal midportion thereof disposing said midportion at a position to be engaged and forced outwardly by a tool inserted into the encircled space surrounded by said annular wall and thereby drive the part of each anchor prong extending from the midportion to the free end outwardly into the surrounding drawer front material.

3. An anchoring device as defined in claim 1, wherein said sleeve portion near said inner end includes inwardly tapering, conical segments terminating in concave tooth formations defined by their free edges at said inner end, said conical segments forming said stud gripping formation and being disposed to intercept and be flexed outwardly by parts of said stud portion upon insertion of the latter into the space encircled by the sleeve portion whereupon said tooth formations engage the surface of the stud portion and restrain the same against withdrawal.

4. An anchoring device as defined in claim 2, wherein said sleeve portion near said inner end includes inwardly tapering, conical segments terminating in concave tooth formations defined by their free edges at said inner end, said conical segments forming said stud gripping formation and being disposed to intercept and be flexed outwardly by parts of said stud portion upon insertion of the latter into the space encircled by the sleeve portion whereupon said tooth formations engage the surface of the stud portion and restrain the same against withdrawal.

5. An anchoring device as defined in claim 1, wherein said sleeve portion near said inner end includes a pair of diametrically opposite inwardly tapering, conical segments terminating in semi-circular concave tooth formations defined by their free edges at said inner end, said conical segments forming said stud gripping formation and being disposed to intercept and be flexed outwardly by parts of said stud portion upon insertion of the latter into the space encircled by the sleeve portion whereupon said tooth formations engage the surface of the stud portion and restrain the same against withdrawal.

6. An anchoring device as defined in claim 2, wherein said sleeve portion near said inner end includes a pair of diametrically opposite inwardly tapering, conical segments terminating in semi-circular concave tooth formations defined by their free edges at said inner end, said conical segments forming said stud gripping formation and being disposed to intercept and be flexed outwardly by parts of said stud portion upon insertion of the latter into the space encircled by the sleeve portion whereupon said tooth formations engage the surface of the stud portion and restrain the same against withdrawal.

* * * * *